US007330362B2

(12) United States Patent
Hesener

(10) Patent No.: US 7,330,362 B2
(45) Date of Patent: Feb. 12, 2008

(54) SWITCHING CONVERTER HAVING AT LEAST TWO CONVERTER STAGES

(75) Inventor: Alfred Hesener, Munich (DE)

(73) Assignee: Infineon Technologies AG, Munich (DE)

( * ) Notice: Subject to any disclaimer, the term of this patent is extended or adjusted under 35 U.S.C. 154(b) by 471 days.

(21) Appl. No.: 11/100,719

(22) Filed: Apr. 7, 2005

(65) Prior Publication Data

US 2005/0242797 A1  Nov. 3, 2005

(30) Foreign Application Priority Data

Apr. 7, 2004  (DE)  ............ 10 2004 017 146

(51) Int. Cl.
*H02M 7/00* (2006.01)
(52) U.S. Cl. .................. 363/65; 323/284; 323/272
(58) Field of Classification Search .......... 363/65, 363/67, 71; 323/272, 283, 284, 285; 307/82
See application file for complete search history.

(56) References Cited

U.S. PATENT DOCUMENTS

| 6,404,175 | B1 | 6/2002 | Yang et al. | |
|---|---|---|---|---|
| 6,800,962 | B2 * | 10/2004 | Bahl et al. | ........... 363/65 |
| 6,903,946 | B1 * | 6/2005 | Wu | ........... 363/65 |
| 2002/0036486 | A1 | 3/2002 | Zhou et al. | |
| 2003/0048648 | A1 | 3/2003 | Lin et al. | |
| 2005/0057238 | A1 | 3/2005 | Yoshida | |

FOREIGN PATENT DOCUMENTS

| DE | 102 23 771 | 12/2003 |
|---|---|---|
| GB | 2 012 501 | 7/1979 |

* cited by examiner

*Primary Examiner*—Jessica Han
(74) *Attorney, Agent, or Firm*—Dicke, Billig & Czaja, PLLC

(57) ABSTRACT

One embodiment of the invention relates to a switching converter having at least two converter stages, an output and an actuation circuit. The at least two converter stages each have power supply terminals for terminal to a supply voltage, a control terminal for supplying an actuation signal, an output terminal for providing an output current and a measurement terminal for providing a measurement signal which is dependent on the respective output current. The output is configured for connecting a load and providing an output voltage for the load, to which output the output terminals of the at least two converter stages are connected. The actuation circuit, to which the measurement signals and a signal which is dependent on the output voltage are supplied, provides the actuation signals. The converter stages are designed to provide a pulse-width-modulated measurement signal whose pulse duration is dependent on the respective output current.

20 Claims, 7 Drawing Sheets

SWITCHING CONVERTER HAVING AT LEAST TWO CONVERTER STAGES

CROSS-REFERENCE TO RELATED APPLICATIONS

This Utility Patent Application claims priority to German Patent Application No. DE 10 2004 017 146.7, filed on Apr. 7, 2004, which is incorporated herein by reference.

BACKGROUND

The present invention relates to a switching converter having at least two converter stages connected in parallel.

To supply voltage and current to loads which draw a large amount of current, it is known practice to provide switching converters, which comprise a plurality of converter stages connected in parallel, each of which provides a portion of the current drawn by the load. In this case, the aim is to actuate the individual converter stages such that they each deliver the same output currents to the load in order to achieve an even distribution of current in the individual converter stages. Such converter stages are also called multiphase converters if the individual converter stages are actuated with offset timing.

To ensure such even distribution of current over the individual converter stages in a switching converter which comprises a plurality of converter stages connected in parallel, it is known practice, for example from GB 2 012 501 A, U.S. Pat. No. 6,404,175 B1 or US Published Application 2003/0048648 A1, to detect the output currents from the individual converter stages and to make a common current signal available on a bus to which all of the converter stages are connected. This current signal is dependent on the output currents from the individual converter stages and is used to actuate the individual converter stages. In the case of this design, the individual converter stages are additionally supplied with a signal that is dependent on the output voltage and that is used to regulate the output voltage from the individual converter stages. In this case, the output voltage is the voltage that is provided by the converter and that is present across a connected load.

In the case of another design for actuating the converter stages in a multiphase converter, which is described in US Published Application 2002/0036486 A1, for example, there is a common actuation circuit for the individual converter stages. The actuation circuit is supplied with a signal, which is dependent on the output voltage, and with current measurement signals from the individual converter stages. The actuation circuit uses these signals to generate actuation signals for the individual converter stages.

It is increasingly desirable for such actuation circuits to be in the form of digital circuits that process the current measurement signals and the output voltage signal digitally in order to produce actuation signals for the individual converter stages. This requires the use of analog/digital converters (A/D converters) for converting the current and voltage measurement signals, which are normally in the form of analog signals, into signals which can be processed digitally. In this context, one A/D converter is needed per converter stage. Such A/D converters, which convert an amplitude value of an analog signal into a measurement value that can be processed digitally, however, are complex to produce. The required complexity increases as the resolution of the A/D conversion increases and as the speed of the A/D conversion increases. Particularly in the case of the switching converters explained, which have a plurality of converter stages, great demands are placed on the accuracy/resolution and the speed of the A/D converters for converting the current measurement signals, which results in a high level of complexity and hence in high costs for such a system.

SUMMARY

One embodiment of the present invention provides a switching converter having a plurality of parallel converter stages that are actuated by an actuation circuit that is simple and inexpensive to produce.

In one embodiment, the switching converter has at least two converter stages, which each have power supply terminals for terminal to a supply voltage, a control terminal for supplying an actuation signal, an output terminal for providing an output current and a measurement terminal for providing a measurement signal which is dependent on the respective output current. In addition, the switching converter has an output for connecting a load and providing an output voltage for the load, to which output the output terminals of the at least two converter stages are connected. To provide actuation signals for the at least two converter stages, an actuation circuit is used to which the measurement signals and a signal which is dependent on the output voltage are supplied and which provides the actuation signals. In this context, the converter stages are designed to provide a pulse-width-modulated measurement signal whose pulse duration or whose duty cycle is dependent on the respective output current.

In one embodiment, transmitting the current information from the individual converter stages to the actuation circuit using pulse-width-modulated signals whose respective pulse duration or whose respective duty cycle represents information about the output current affords that pulse-width-modulated signals can be converted with little circuit complexity into signals which can be processed digitally. In addition, pulse-width-modulated signals are robust in the face of fluctuations in a supply voltage, which can result in fluctuations in the amplitude of the pulse-width-modulated signal, since the amplitude of pulse-width-modulated signals—unlike the amplitude of amplitude-modulated signals—carries no information.

In one embodiment, the individual converter stages of the switching converter are in the form of step-down converters (Buck converters) and each comprise an inductance and a first transistor, the inductance being connected to the respective output terminal and being connected to the power supply as stipulated by the respective actuation signal.

In one embodiment, a measurement arrangement that is present in the individual converter stages and which ascertains the output current from the converter and provides a measurement signal which is dependent on this output current is coupled to the first transistor, for example, in order to detect the current through this first transistor. In this context, the output current from the respective converter is measured only when the first transistor is on.

In one embodiment, the measurement arrangement comprises a current mirror arrangement for providing a measurement current which is proportional to a current through the first transistor, a current/voltage converter for providing a measurement voltage which is dependent on the measurement current, and a comparator arrangement for comparing the measurement voltage with a reference value and providing the pulse-width-modulated measurement signal. In this context, the comparator arrangement is designed to provide a first level of the measurement signal when the first transistor is turned on and to provide a second level of the measurement signal when the measurement voltage reaches the reference value.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
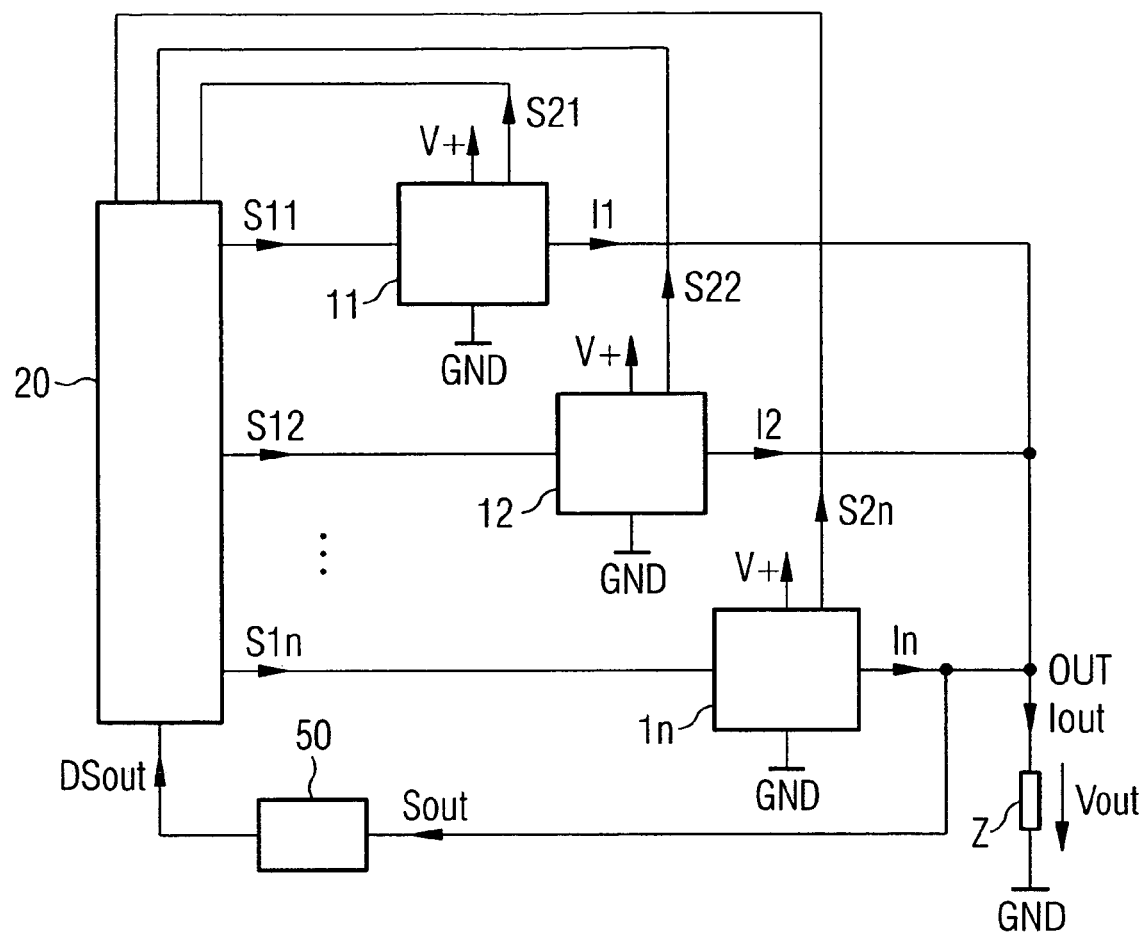
FIG. 1 illustrates an inventive switching converter having a plurality of converter stages connected in parallel which together contribute to the power supply for a load and which are actuated by a common actuation circuit.

With reference to FIG. 1, one embodiment of a switching converter has a plurality of converter stages 11, 12, 1n. The individual converter stages each comprise power supply terminals for terminal to a supply voltage, which is applied between a terminal for a first supply potential V+ and a terminal for a second supply potential, a control terminal for supplying an actuation signal S11, S12, S1n, an output terminal for providing an output current I1, I2, In and a measurement terminal for providing a current measurement signal S21, S22, S2n, which is dependent on the respective output current I1, I2, In. Although just three converter stages 11, 12, 1n are illustrated for the switching converter illustrated in FIG. 1, it should be pointed out that it is naturally possible to connect any number of converter stages in parallel which are each connected to the supply voltage, which are each supplied with an actuation signal and which each provide an output current and a measurement signal which is dependent on the output current.

The outputs of the individual converter stages 11, 12, 1n, which provide the output currents I1, I2, In, are together connected to an output terminal OUT of the switching converter, to which terminal a load Z can be connected. The switching converter has the task of providing an at least approximately constant output voltage Vout for the load. In this context, the output current Iout which is required for maintaining the output voltage Vout and which is drawn by the load Z is provided jointly by the individual converter stages 11, 12, 1n.

To actuate the individual converter stages 11, 12, 1n, there is an actuation circuit 20 which provides the actuation signals S11, S12, S1n for the individual converter stages. In one embodiment, this actuation circuit has the task of actuating the individual converter stages 11, 12, 1n such that the output voltage Vout is held constant regardless of load and that the individual converter stages 11, 12, 1n provide at least approximately the same output currents I1, I2, 1n. To regulate the output voltage Vout, the actuation circuit 20 is supplied with an output signal Sout which is dependent on the output voltage Vout. In the example, this output signal Sout matches the output voltage Vout, but can also be produced from the output voltage Vout using a voltage divider in a manner which is not illustrated in more detail. To regulate the current distribution in the individual converter stages 11, 12, 1n, the actuation circuit 20 is supplied with current measurement signals S21, S22, S2n from the individual converter stages 11, 12, 1n which are dependent on the output current I1, I2, In from the respective converter stage 11, 12, 1n.

The converter stages 11, 12, 1n are designed to provide pulse-width-modulated current measurement signals S21, S22, S2n. In one embodiment, the information about the amplitude of the respective output current I1, I2, In is held in the pulse duration or in the duty cycle of the respective pulse-width-modulated measurement signal S21, S22, S2n. Transmitting the information about the output currents I1, I2, In of the individual converter stages 11, 12, 1n to the actuation circuit 20 using pulse-width-modulated signals affords that pulse-width-modulated signals, unlike amplitude-modulated signals, can be converted in the actuation circuit 20 in a comparatively simple manner into digital measurement signals for further processing. In the case of the inventive switching converter, an A/D converter for converting an amplitude-modulated signal into a digital signal is required only for converting the analog output signal Sout into a digital output signal DSout which is connected upstream of the actuation circuit 20.

Figure 2:
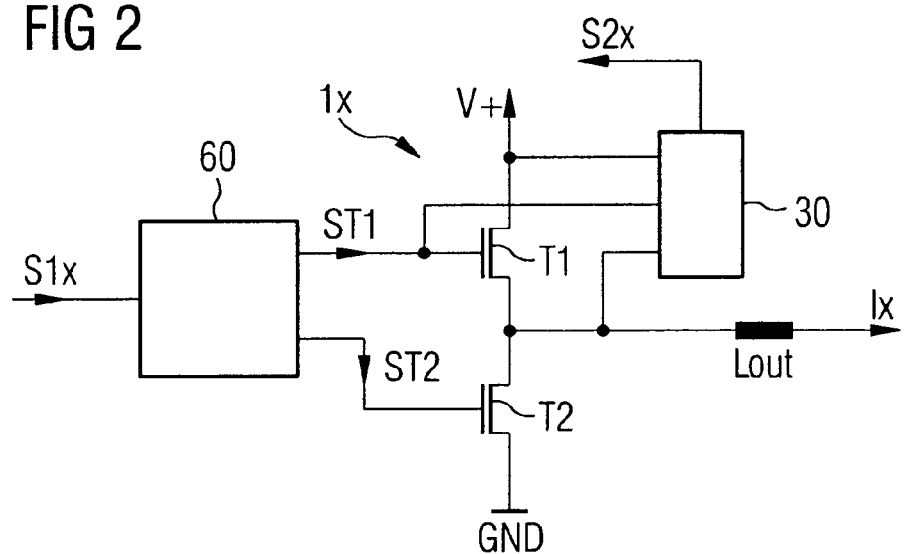
FIG. 2 illustrates an arbitrary one of the converter stages, which has a current measurement arrangement for providing a pulse-width-modulated measurement signal which is dependent on an output current.

In one embodiment, the individual converter stages 11, 12, 1n are in the form of step-down converters (buck converters), as illustrated in FIG. 2. FIG. 2 illustrates, by way of example, an arbitrary one of the converter stages 11, 12, 1n, which is denoted by the reference symbol 1x in FIG. 2. The signals S1x, S2x and Ix accordingly represent one of the actuation signals S11, S12, S1n, one of the measurement signals S21, S22, S2n and one of the output currents I1, I2, In. The converter stage, which is in the form of a step-down converter, comprises two transistors T1, T2, which are in the form of MOSFETs in the example and whose load paths are connected between the first supply potential V+ and the second supply potential GND. In this context, the first supply potential V+ is a positive supply potential, for example, while the second supply potential is a reference-ground potential, particularly ground. A load terminal which is common to the two transistors T1, T2 has an inductance Lout connected to it which has the output current Ix flowing through it.

The two transistors T1, T2 are actuated by a driver circuit 60 as stipulated by the actuation signal S1x. The driver circuit 60 converts the actuation signal S1x into actuation signals ST1, ST2 with suitable levels for the two transistors T1, T2 and in so doing ensures that the two transistors T1, T2 are never on at the same time. The output current Ix from the converter stage is determined to a considerable extent by the duty cycle of the actuation of the first transistor T1, that is, by the ratio of the turned-on period and the period duration of an actuation period for this first transistor T1. In one case, the duty cycle of the actuation signal ST1 for the first transistor T1 corresponds to the duty cycle of the actuation signal S1x. It should be pointed out that the driver circuit 60 may also be part of the actuation circuit 20, which means that the actuation circuit 20 delivers two actuation signals for each of the converter stages, namely a first actuation signal for the respective first transistor T1 and a second actuation signal for the respective second transistor T2.

In one embodiment, the second transistor T2 serves merely as a freewheeling element for the inductance Lout when the first transistor T1 is off, and may also be replaced by a diode in a manner which is sufficiently well known.

Figure 3:
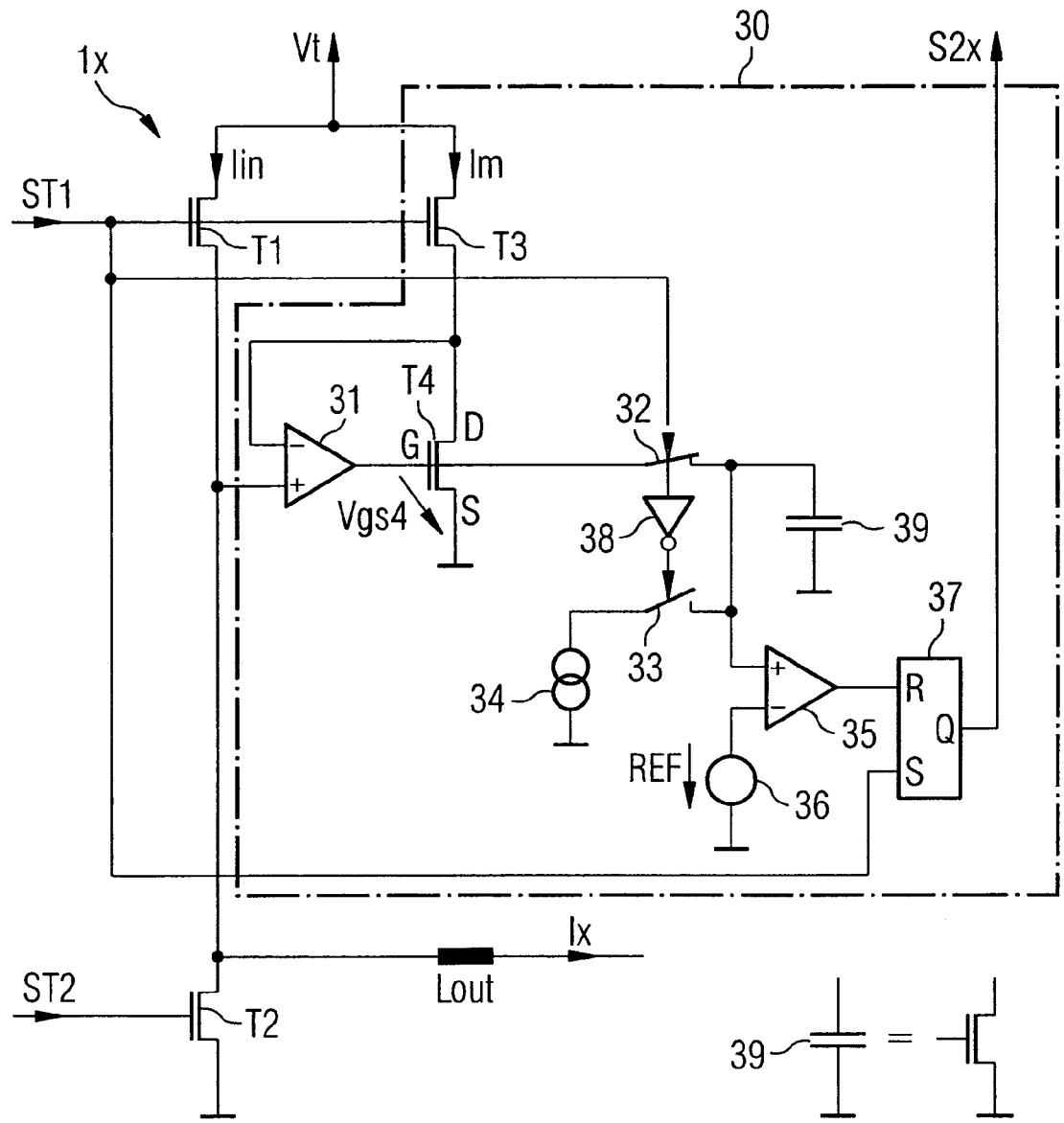
FIG. 3 illustrates a first exemplary embodiment of the circuit of the current measurement arrangement.
Figure 4:
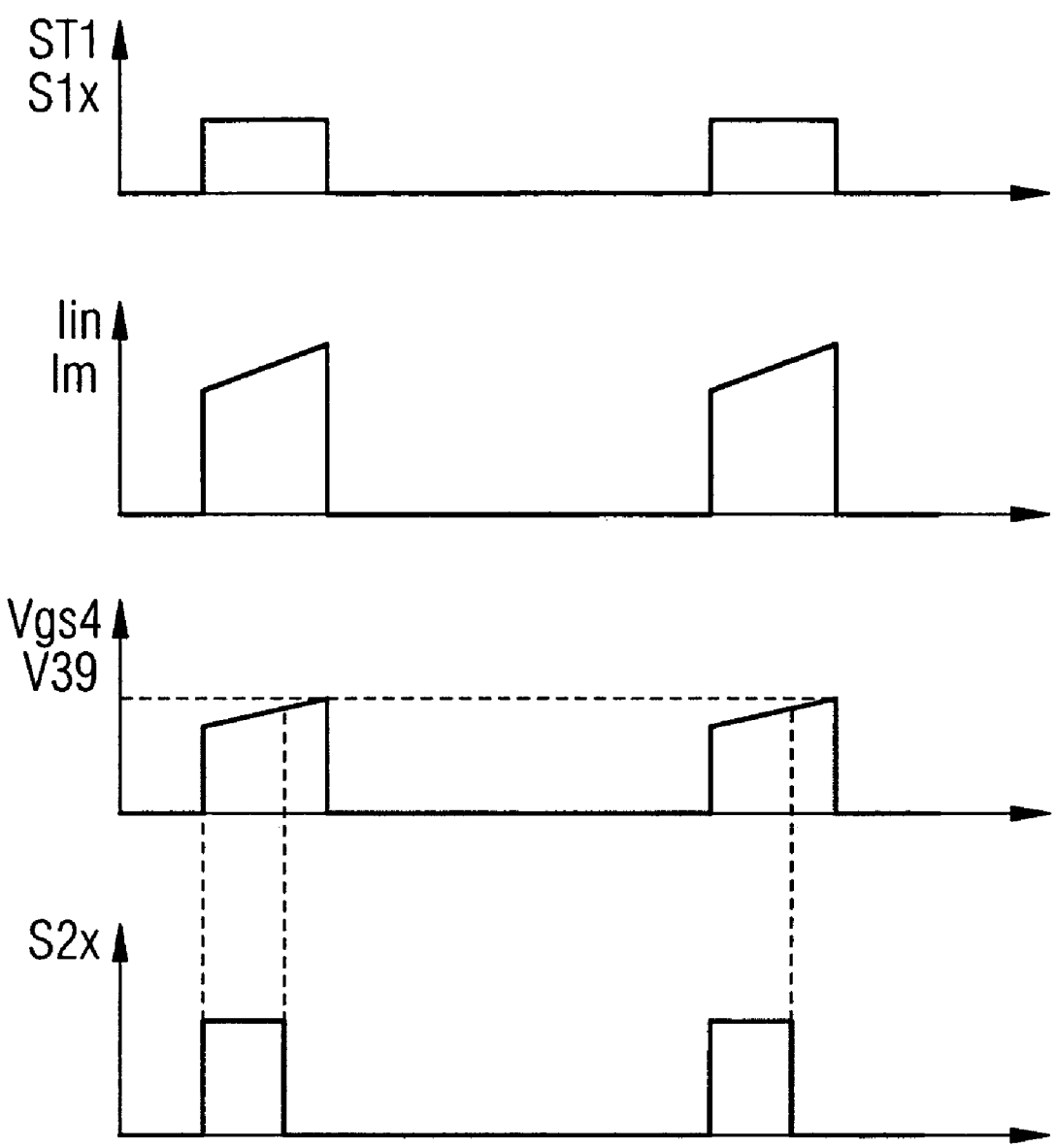
FIG. 4 illustrates the way in which the current measurement arrangement works using selected signals which occur in the current measurement arrangement.

The converter stage 1x also comprises a current measurement arrangement 30 which is coupled to the load terminals and the control terminal of the first transistor T1 and which provides a pulse-width-modulated current measurement signal S2x. An exemplary embodiment of the circuit of such a measurement arrangement 30 is illustrated in FIG. 3.

This measurement arrangement works on the basis of the "current sense principle" and comprises a third transistor T3, whose control terminal is connected to the control terminal of the first transistor T1 and whose first load terminal is connected to the corresponding load terminal of the first transistor T1. In addition, there is a regulating arrangement having an operational amplifier 31 and a fourth transistor T4, which regulating arrangement prompts the third transistor T3 to be operated at the same operating point as the first transistor T1, so that a measurement current Im flowing through the third transistor T3 is proportional to a load current Iin flowing through the first transistor T1. The proportionality factor is obtained from the aspect ratio of the two transistors, and the first transistor T1, serving as load transistor, normally has a much larger transistor area than the measurement transistor T3. Usual aspect ratios are in the region of 3000:1. To set the operating point of the measurement transistor T3, the load path of the fourth transistor T4 is connected between the second load terminal of the third transistor T3 and reference-ground potential GND. The operational amplifier 31 compares the potential on the second load terminal of the first transistor T1 with the potential on the second load terminal of the measurement transistor T3 and actuates the fourth transistor T4 such that these potentials are equal, as a result of which the two transistors T1, T3 are operated at the same operating point.

In one embodiment, the first, third and fourth transistors T1, T3, T4 are in the form of n-channel transistors whose gate terminal forms the control terminal, whose drain terminal forms the first load terminal and whose source terminal forms the second load terminal.

The gate terminal G of the fourth transistor is coupled to the output of the operational amplifier 31, and its source terminal is connected to reference-ground potential GND. To regulate the operating points of the first and third transistors T1, T3 to the same respective operating point, that is, to regulate the source potentials of these transistors T1, T3 to the same value, a gate/source voltage Vgs4 which, by virtue of the characteristic curve of the fourth transistor T4, is related to the measurement current Im flowing through the fourth transistor T4 appears between the gate G and the source S of the fourth transistor T4. The measurement arrangement 30 uses this gate/source voltage Vgs4 as a measure of the measurement current Im, which is proportional to the load current Iin, and to produce the pulse-width-modulated current measurement signal S2x. In this context, the fourth transistor T4 works as a current/voltage converter.

To ascertain this gate/source voltage Vgs4 and process it further, there is a capacitive storage element 39, in one case a capacitor, which is connected in parallel with the gate/source path Vgs4 of the fourth transistor T4, that is, between the output of the operational amplifier 31 and reference-ground potential GND, as stipulated by the actuation signal ST1 for the first transistor T1. This output of the operational amplifier 31 and the capacitive storage element 39 have a first switch 32 connected between them which is closed when the first transistor T1 is on, as a result of which a voltage V39 across the capacitor 39 follows the gate/source voltage Vgs4 of the fourth transistor T4.

A comparator 35 is used to compare this capacitor voltage V39 with a reference voltage REF provided by a reference voltage source 36. The output of the comparator 35 actuates the reset input R of an RS-type flipflop, whose set input is actuated by the actuation signal ST1 for the first transistor T1. An output Q of this flipflop provides the pulse-width-modulated current signal S2x.

In addition, the capacitor C39 is connected to reference-ground potential GND via a second switch 33 and a discharge current source 34. The second switch 33 is actuated in complementary fashion to the first switch 32 and is used to discharge the capacitor 39 after the first transistor T1 is turned off for a subsequent measurement operation. In the case of this measurement arrangement, the output current Ix is ascertained only when the first transistor T1 is on, in which case the load current Iin flowing through the first transistor T1 corresponds to the output current Ix.

The way in which the current measurement arrangement 30 illustrated in FIG. 3 works is explained in more detail below with reference to time profiles for the actuation signal ST1 of the first transistor T1, for the load and measurement currents Iin, Im, for the capacitor voltage V39 and for the measurement signal S2x. For the illustration, it is assumed that the first transistor T1 is on when the actuation signal ST1 is at a high level and is off when this actuation signal is at a low level. It is also assumed for the illustration that the switch T1 was already on beforehand and that the inductance Lout does not commutate off completely between individual turn-on operations, which means that the load current Iin through the first transistor T1 rises immediately to a value not equal to zero when the first transistor T1 is turned on. Starting from this initial value, the load current Iin rises, and approximately linearly on the basis of the measurement current Im, which is proportional to the load current Iin, as the turned-on period increases.

On the basis of the measurement current Im, the gate/source voltage Vgs4 of the fourth transistor T4 and hence the capacitor voltage V39 also quickly assume an initial value when the first transistor T1 is turned on, and this voltage likewise rises starting from this initial value as the measurement current Im increases. It should be pointed out that the relationship between the measurement current Im and the gate/source voltage Vgs4 is fundamentally nonlinear. To simplify the illustration, however, such linear dependence of the measurement current Im on the gate/source voltage Vgs4 has been assumed.

A rising edge of the actuation signal ST1 sets the flipflop 37, which causes the measurement signal S2x to assume a high level. In this case, the flipflop 37 is set until the capacitor voltage V39 reaches the value of the reference signal REF. When this flipflop 37 is reset, the measurement signal S2x assumes a low level. The pulse duration of the individual pulses in the measurement signal is thus dependent on the period between the point at which the first transistor T1 is turned on and the point at which the capacitor voltage V39 reaches the reference voltage REF. For an assumed linearity between the measurement current Im and the capacitor voltage V39, this period is directly proportional to the mean current drawn during the period for which the first transistor T1 is on, and is thus directly proportional to the output current Ix.

The nonlinearity between the measurement current Im and the capacitor voltage V39 means that this period is not proportional to the mean output current Ix from the converter stage. This is not a drawback for correct operation of the switching converter, however, since for regulating the current drawn by the individual converter stages it is not relevant to ascertain the output current which actually flows, but rather, since it is merely relevant, to obtain information regarding whether the converter stages deliver the same output currents, or which of the converter stages deliver(s) a smaller or larger current.

When the output currents I1, I2, In are the same, the pulse durations of the pulse-width-modulated signals S21, S22, S2n from all converter stages are the same. If one converter stage delivers a smaller output current I1, I2, In than the other converter stages, then the result of this is a longer pulse duration for the respective measurement signal, since a period between turning on the first transistor T1 and reaching the reference voltage REF is correspondingly longer.

As capacitor 39, whose voltage V39 is compared with the reference voltage REF, it is possible to use, in particular, the gate/source capacitance of a MOS transistor, as illustrated in FIG. 3.

It is naturally possible to provide any other current/voltage converters in the measurement arrangement 30 for converting the measurement current Im into a voltage value.

Figure 5:
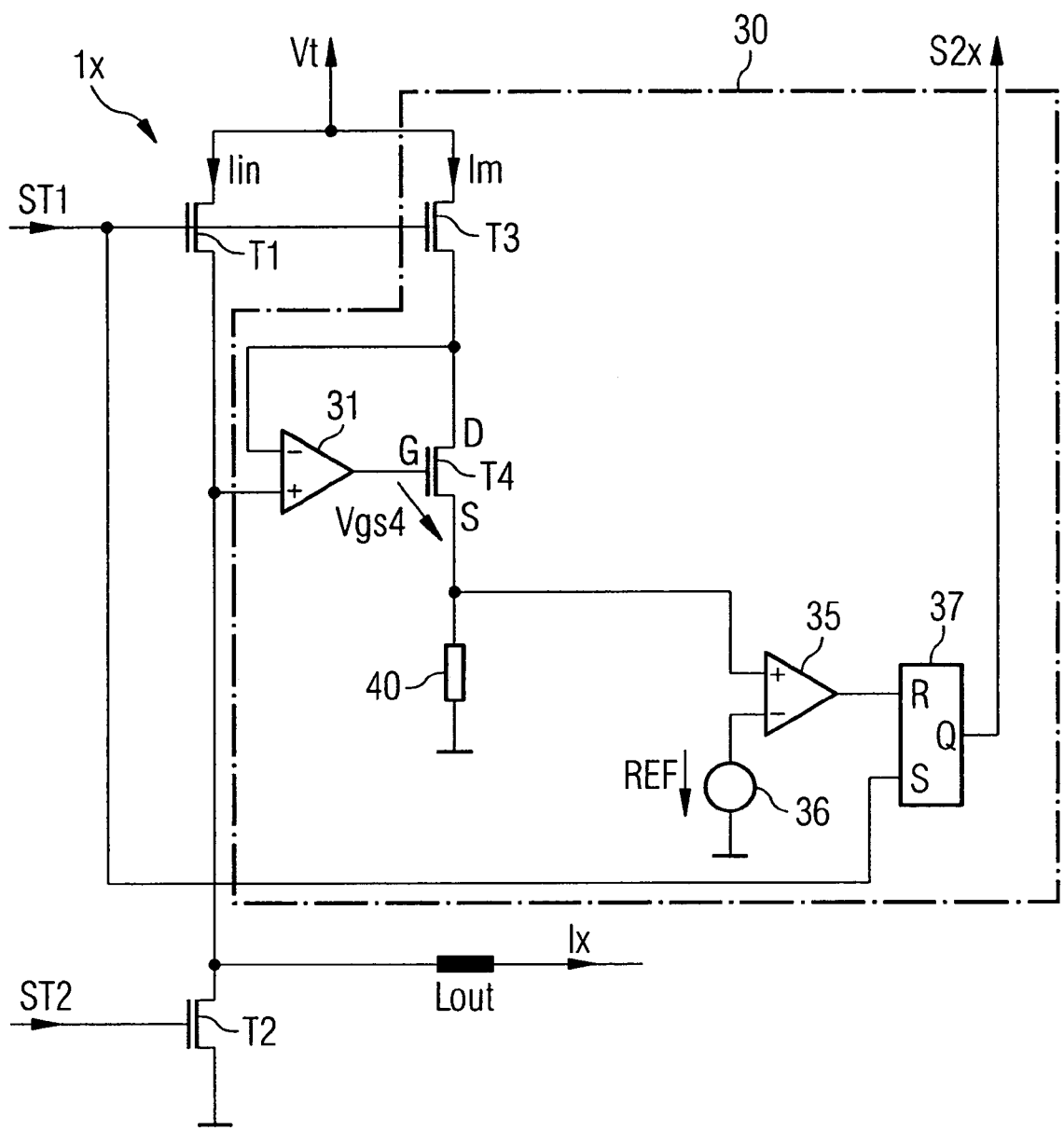
FIG. 5 illustrates an exemplary embodiment of the circuit of the current measurement arrangement.

FIG. 5 illustrates a further exemplary embodiment of the current measurement arrangement, in which a resistor 40 is connected in series with the fourth transistor T4. This resistor 40 delivers a voltage signal V40 which is proportional to the measurement current Im, and which is compared with the reference voltage REF by the comparator 35 on the basis of the capacitor voltage V39 illustrated in FIG. 3. In this embodiment, there is a linearity between the duration of the pulses in the measurement signal S2x and the measurement current Im.

Figure 6:
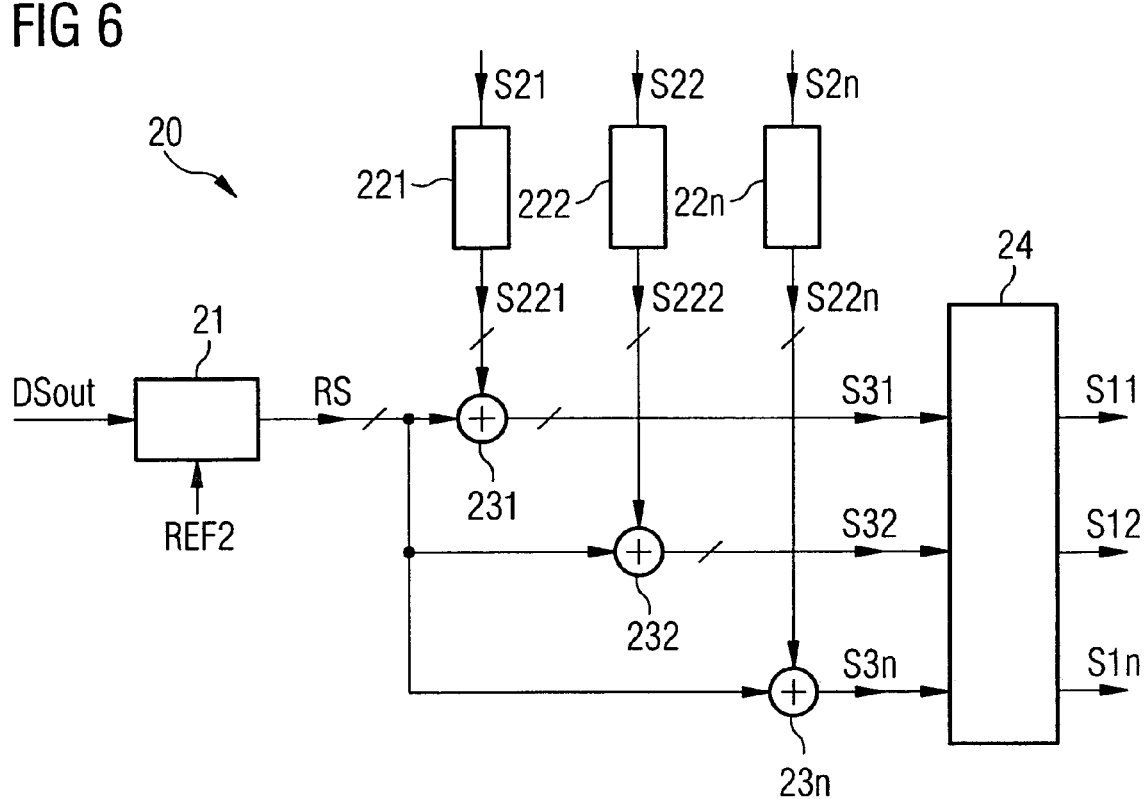
FIG. 6 illustrates the actuation circuit, which has a regulator and a number of converter units (which each convert a pulse-width-modulated measurement signal into a digital signal) which corresponds to the number of converter stages.

FIG. 6 illustrates an example of the actuation circuit 20 for producing the actuation signals S11, S12, S2n from the digital output signal DSout and from the pulse-width-modulated current measurement signals S21, S22, S2n.

The actuation circuit has a digital regulator 21, which is in the form of a PI controller, for example, and to which the digital output signal DSout and a second reference value REF2 are supplied. This second reference value REF2 represents a nominal value for the output voltage Vout from the switching converter. The output of this digital regulator 21 provides a digital regulating signal RS which is used to produce the actuation signals S11, S12, S1n for the individual converters in a manner which will be explained. In addition, the actuation circuit also comprises converter units 221, 222, 22n for converting pulse-width-modulated signals into digital signals, which are each supplied with one of the pulse-width-modulated current measurement signals S21, S22, S2n and which each provide a digital measurement signal S221, S222, S22n. Each of these digital current measurement signals S221, S222, S22n is added to the digital regulating signal RS using an adder 231, 232, 23n, in order to provide digital control signals S31, S32, S3n for the individual converter stages. These digital control signals S31, S32, S3n are supplied to an output stage 24 in the actuation circuit, which converts these digital control signals into pulse-width-modulated actuation signals S11, S12, S1n for the individual converter stages 11, 12, 1n. In this case, the duty cycle of each of these actuation signals S11, S12, S1n is dependent on one of the digital control signals S31, S32, S3n.

Figure 9:
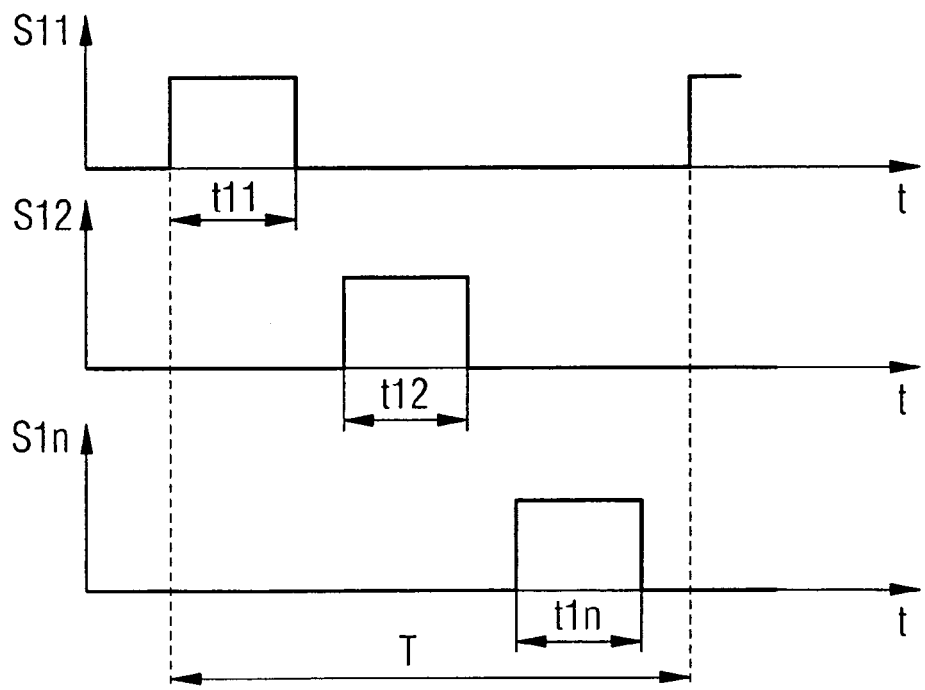
FIG. 9 illustrates time profiles for the actuation signals of the individual converter stages.

In one embodiment, the output stage 24 of the actuation circuit is designed to actuate the individual converter stages with offset timing, as illustrated in FIG. 9. FIG. 9 illustrates the actuation signals S11, S12, S1n for the individual converter stages during a period T within which each converter stage is actuated precisely once. As can be seen, actuation pulses in the individual actuation signals S11, S12, S1n are offset from one another in time, which means that just one of the converter stages is ever actuated during a period. The periods t11, t12, t1n of the actuation are in this case dependent on the associated digital control signals S31, S32, S3n, that is, that the actuation period t11 in the first converter stage is dependent on the digital control signal S31, the period t12 is dependent on the digital control signal S32 and the period t1n is dependent on the digital control signal S3n. When step-down converters as illustrated in FIG. 2 are used in the converter stages, the actuation periods t11, t12, t1n each correspond to the turned-on periods of the first transistor T1 in the respective converter stage. The actuation periods t11, t12, t1n have a direct influence on the current drawn by the respective converter stage, it being the case that the current drawn by the respective converter stage is larger the longer the actuation period.

The digital control signals S31, S32, S3n contain a component which is dependent on the output voltage Vout and results from the regulating signal RS and a component which results from the output current I1, I2, In from the respective converter stage 11, 12, 1n. If the output current I1, I2, In from one of the converter stages 11, 12, 1n is smaller than the output current I1, I2, In from the other converter stages 11, 12, 1n, the result of this is a longer pulse duration for the associated current measurement signal S21, S22, S2n and a larger digital control signal S31, S32, S3n. The result of this is that the turned-on period of the respective converter stage 11, 12, 1n is lengthened during an actuation period T, resulting in the output current I1, I2, In from the converter stage rising in order to align itself with the output currents from the other converter stages.

If the output voltage Vout falls, for example as a result of a greater amount of current drawn by the load, then the digital regulating signal becomes larger, which results in an even increase in the size of the digital control signals S31, S32, S3$n$, meaning that the output currents I1, I2, In from all of the converter stages are increased to the same extent. If there is a rise in the output voltage Vout, the output currents from all of the converter stages are accordingly reduced in size.

Figure 7A:
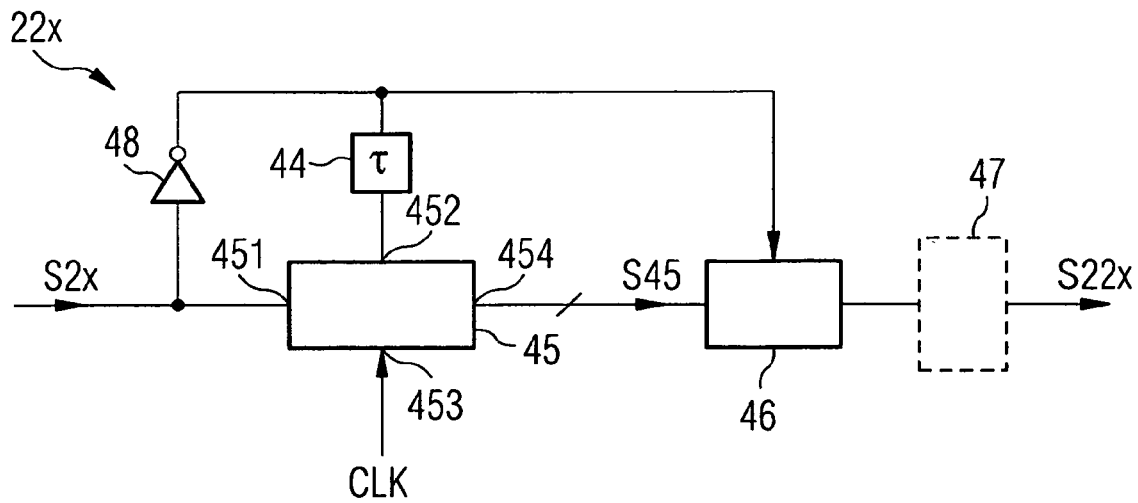
FIG. 7a illustrates an exemplary embodiment of a converter unit for converting a pulse-width-modulated signal into a digital signal.
Figure 7B:
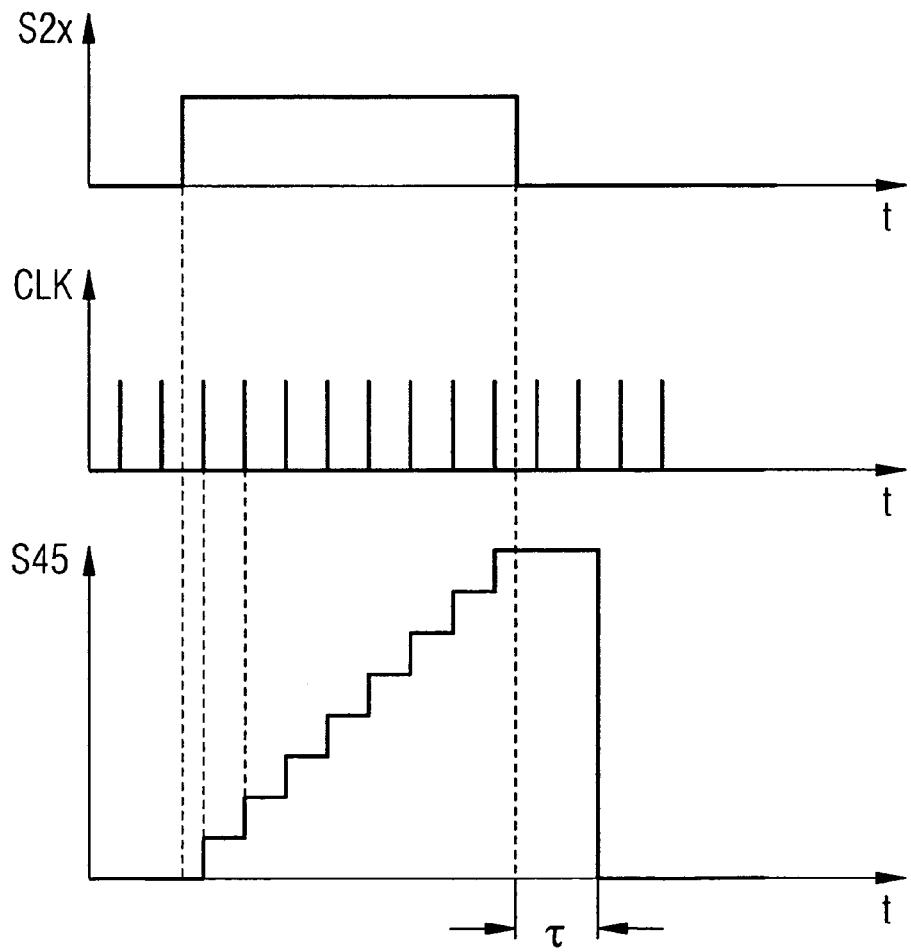
FIG. 7b illustrates time profiles for selected signals which occur in the converter unit.

FIG. 7$a$ illustrates an exemplary embodiment of the converter units 221, 222, 22$n$ for converting the pulse-width-modulated measurement signals S21, S22, S2$n$ into digital measurement values S221, S222, S22$n$. The reference symbol 22$x$ in FIG. 7 represents an arbitrary one of these converter units, S2$x$ represents an arbitrary one of the pulse-width-modulated measurement signals, and S22$x$ represents one of the digital measurement values. The converter unit comprises a digital counter 45 with an enable input 451, a reset input 452 and a clock signal input 453. In this case, the enable input 451 is supplied with the pulse-width-modulated measurement signal S2$x$. The counter 45 is designed to be incremented starting from an initial value when there is a prescribed level of the pulse-width-modulated signal, for example the high level, as stipulated by the clock signal CLK. This initial value, to which the counter is reset when a reset signal is applied to the reset input 452, is in one case zero. The frequency or the period duration of the clock signal CLK is tuned to the pulse-width-modulated measurement signals S2$x$ provided by the converter stages such that the period duration of the clock signal CLK is smaller than the minimum pulse duration of the pulse-width-modulated signal S2$x$.

The way in which this converter unit works in one embodiment is explained below with reference to FIG. 7$b$. FIG. 7$b$ illustrates time profiles for the pulse-width-modulated measurement signal S2$x$, for the clock signal CLK and for a digital counter value S45 which is available at an output 454 of the counter. The counter 45 is incremented after a rising edge of the pulse-width-modulated signal S2$x$ upon every pulse of the clock signal CLK, in one case by the value 1 in each case. The counter reading S45 is stored in a register 46 connected downstream of the counter 45 at the end of the pulse duration. To this end, a loading input on the register 46 is supplied with the inverted pulse-width-modulated measurement signal S2$x$ in order to store the counter value S45 provided by the counter 45 at the end of the pulse duration. When a delay period τ after the falling edge of the measurement signal S2$x$ has elapsed, the counter 45 is reset to the initial value again, in one case zero. To this end, the reset input 452 of the counter 45 is supplied with the inverted measurement signal S2$x$ delayed by means of a delay element 44. The output of the register 46 provides the digital measurement signal S22$x$ for further processing in the actuation circuit. Optionally, the register 46 has a divider 47 connected downstream of it which is used to scale the digital current measurement value S2$x$ added to the digital regulating signal RS, in order to be able to tune the amplitudes of the regulating signal RS and of the digital current measurement signals S21, S22, S2$n$ to one another.

Figure 8:
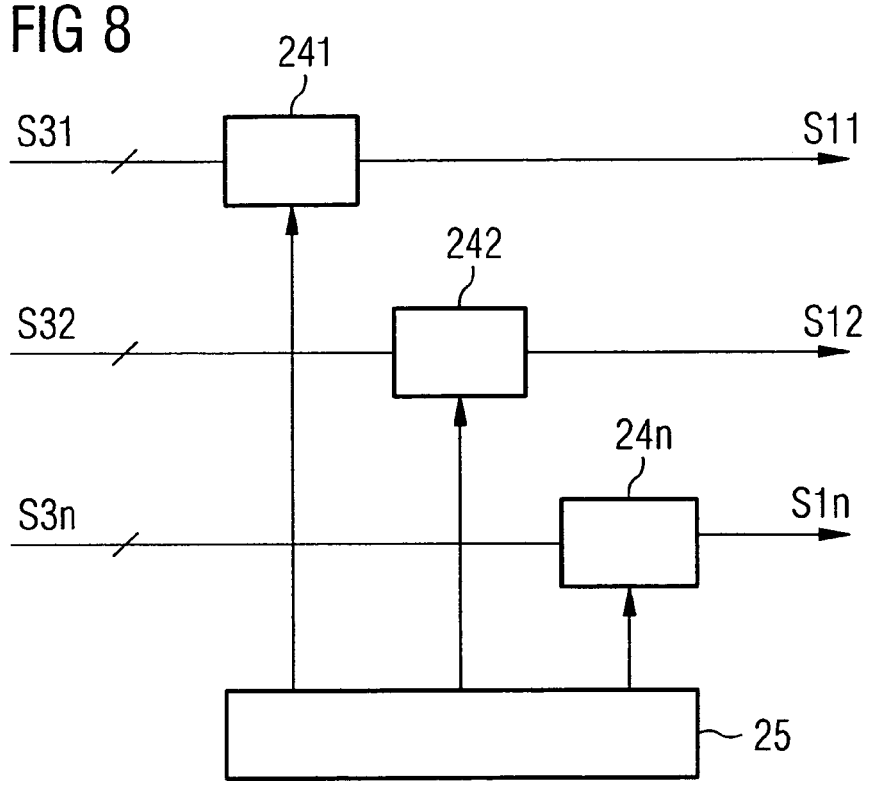
FIG. 8 illustrates an exemplary embodiment of an output stage in the actuation circuit.

An exemplary embodiment of the output stage 24 of the actuation circuit is illustrated in FIG. 8. This output stage 24 is in the form of a pulse width modulator arrangement and comprises a number of digital pulse width modulators for converting the digital control signals S31, S32, S3$n$ into pulse-width-modulated signals S11, S12, S1$n$ which corresponds to the number of converter stages which are to be actuated, the pulse durations of the individual pulses of these pulse-width-modulated signals each being dependent on one of the digital control signals S31, S32, S3$n$.

These converter units 241, 242, 24$n$ can each be produced (in a manner which is not illustrated in more detail) using a down-counter, for example, which is loaded with the respective digital control signal value and which is decremented to a prescribed final value, in one case zero, as stipulated by a clock signal. In this case, the pulse duration of one pulse of the actuation signal S11, S12, S1$n$ corresponds to the period which is required for decrementing the counter starting from the initial value.

The output stage also comprises a control circuit 25 which actuates the individual modulators 241, 242, 24$n$ in order to stipulate the respective starting times of the individual pulses in the actuation signals, the control circuit 25 being designed, in particular, to actuate the individual converter units 241, 242, 24$n$ with offset timing in order to achieve a time sequence for the actuation pulses of the individual converter stages as illustrated in FIG. 9.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A switching converter comprising:
   at least two converter stages, each having power supply terminals for terminal to a supply voltage, a control terminal for supplying an actuation signal, an output terminal for providing an output current and a measurement terminal for providing a measurement signal that is dependent on the respective output current;
   an output for connecting a load and providing an output voltage for the load, to which output the output terminals of the at least two converter stages are connected; and
   an actuation circuit to which the measurement signals and a signal that is dependent on the output voltage are supplied and that provides the actuation signals;
   wherein the converter stages are designed to provide a pulse-width-modulated measurement signal whose pulse duration is dependent on the respective output current.

2. The switching converter of claim 1, wherein the actuation circuit comprises a regulator to which the signal that is dependent on the output voltage, and also a reference signal are supplied and that provides a first digital regulating signal value, which is used to produce the actuation signals.

3. The switching converter of claim 1, wherein the actuation circuit has an analog/digital converter device to which the measurement signals are supplied and that provides digital measurement values that are each dependent on the pulse duration of the individual pulse-width-modulated measurement signals.

4. The switching converter of claim 3, wherein the actuation circuit logically combines each of the digital measurement values with the regulating signal to form a respective control signal, these being supplied to a pulse width modulator arrangement which produces an actuation signal for one of the converter stages from each of these control signals.

5. The switching converter of claim 1, wherein each converter stage has an inductance and a first transistor, the inductance being connected to the respective output terminal and being connected to the power supply as stipulated by the respective actuation signal.

6. The switching converter of claim 5, wherein each of the converter stages have a measurement arrangement for providing the respective measurement signal, said measurement arrangement being coupled to the first transistor.

7. The switching converter of claim 6, further comprising:
a current mirror arrangement for providing a measurement current that is proportional to a current through the first transistor;
a current/voltage converter for providing a measurement voltage that is dependent on the measurement current; and
a comparator arrangement for comparing the measurement voltage with a reference value and providing the measurement signal.

8. The switching converter of claim 7, wherein the comparator arrangement is designed to provide a first level of the measurement signal when the first transistor is turned on and to provide a second level of the measurement signal when the measurement voltage reaches the reference value.

9. A switching converter comprising:
a first converter stage having a first control terminal for supplying a first actuation signal, a first output terminal for providing a first output current, and a first measurement terminal for providing a first measurement signal that is dependent on a first output current;
a second converter stage having a second control terminal for supplying a second actuation signal, a second output terminal for providing a second output current, and a second measurement terminal for providing a second measurement signal that is dependent on the second output current;
an output circuit for connecting a load and for providing an output voltage for the load; and
an actuation circuit that provides the first and second actuation signals, the actuation circuit including an analog/digital converter device that provides digital measurement values;
wherein the first and second converter stages are designed to provide pulse-width-modulated measurement signals having pulse durations that are dependent on the first and second output currents, respectively;
wherein the first and second output terminals of the first and second stages are coupled to the output circuit;
wherein a signal that is dependent on the output voltage is supplied to the actuation circuit.

10. The switching converter of claim 9, wherein the actuation circuit comprises a regulator to which the signal that is dependent on the output voltage is supplied, that provides a first digital regulating signal value that is used to produce the actuation signals.

11. The switching converter of claim 10, wherein the analog/digital converter device of the actuation circuit provides digital measurement values that are each dependent on the pulse duration of the individual pulse-width-modulated measurement signals.

12. The switching converter of claim 11, wherein the actuation circuit logically combines each of the digital measurement values with the regulating signal to form a respective control signal, the control signal being supplied to a pulse width modulator arrangement that produces an actuation signal for one of the converter stages from each of these control signals.

13. The switching converter of claim 12, wherein each of the first and second converter stages have an inductance and a first transistor, the inductance being connected to the first and second output terminals and being connected to a power supply terminal of each of the first and second converter stages.

14. The switching converter of claim 13, wherein the first and second converter stages each have a measurement arrangement for providing the respective measurement signal, wherein each measurement arrangement is coupled to the first transistor.

15. The switching converter of claim 14, further comprising:
the current mirror arrangement for providing a measurement current that is proportional to a current through the first transistor;
a current/voltage converter for providing a measurement voltage that is dependent on the measurement current; and
a comparator arrangement for comparing the measurement voltage with a reference value and providing the measurement signal.

16. The switching converter of claim 15, wherein the comparator arrangement is designed to provide a first level of the measurement signal when the first transistor is turned on and to provide a second level of the measurement signal when the measurement voltage reaches the reference value.

17. A switching converter comprising:
a plurality of converter stages, each stage having power supply terminals for a supply voltage, a control terminal for supplying an actuation signal, and output terminal for providing and output current, and a measurement terminal for providing a measurement signal that is dependent on the respective output current;
means for connecting a load and for providing an output voltage; and
means for providing the actuation signals;
wherein the converter stages are designed to provide a pulse-width-modulated measurement signal with a pulse duration that is dependent on the respective output current.

18. The switching converter of claim 17, wherein the output terminals of each of the plurality of converter stage is coupled to the means for connecting a load.

19. The switching converter of claim 18, wherein the measurement signals and a signal that is dependent on the output voltage are supplied to the means for providing the actuation signals.

20. The switching converter of claim 19, wherein the means for providing the actuation signal further comprises a regulator to which the signal that is dependent on the output voltage and a reference signal are supplied, wherein the regulator provides a first digital regulating signal value that is used to produce the actuation signals.

* * * * *